UNITED STATES PATENT OFFICE.

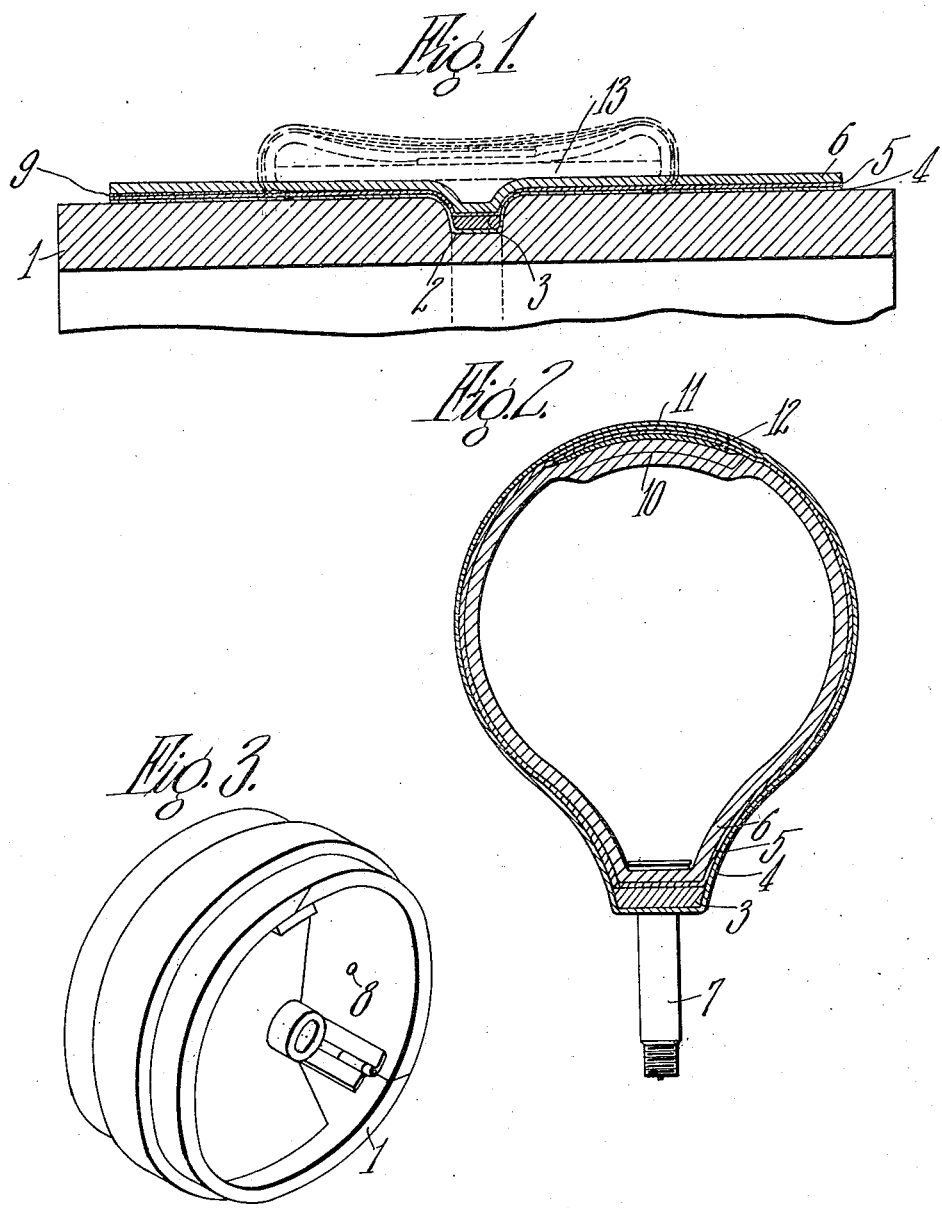

WARREN F. FERRIS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

PROCESS FOR BUILDING FLUID-BAGS.

1,297,295.  Specification of Letters Patent.  Patented Mar. 11, 1919.

Application filed November 5, 1918. Serial No. 261,230.

*To all whom it may concern:*

Be it known that I, WARREN F. FERRIS, a citizen of the United States of America, residing in Springfield, in the county of Hampden and State of Massachusetts, have invented certain new and useful Improvements in Processes for Building Fluid-Bags, of which the following is a specification.

My invention relates to rubber tubes and more particularly to a process for building fluid-bags.

In building pneumatic tires, the casing or tire is built up on a core and then placed in a mold and vulcanized. In many instances, the tire is placed in the mold and vulcanized while upon the core upon which it is built. But, in a large number of cases, it has been found good practice to remove the core from the tire and introduce in its stead an inflatable bag, commonly called a "water bag", since the inflating medium is usually water. When the bag is inflated, the tire is pressed against the mold with, as is evident, advantageous results. Since the bag acts as a species of support for the tire, it is highly important that the bag have the exactly proper shape and a suitable sustaining ability. It is to the production of such a bag that this invention relates.

In order to properly sustain, form, and press the base portions of the tire, it has been found desirable to make these bags with a solid rubber "base ring" or strip to lie between the base portions of the tire when the tire is in the mold. But, if, in the building of these bags, suitable steps are not taken to properly locate the base ring and adjacent parts, the base ring very likely will not be properly initially positioned by the builder, and, even though it be, it is likely to shift in the building operation from its correct position. So, when the bag comes to be vulcanized, its base strip will be vulcanized in, and come to rest in, a wholly incorrect position. Frequently, for example, the base strip will so shift as to "climb" up one side of the bag, say the right, and so render the bag incapable of giving the left-hand tire base the required support, and the right-hand base will not be supported properly either. Again, if the bag be made as a straight tube with the ends ultimately joined, the bag will have its inner and outer peripheries containing the same amount of material, so that the bringing of the ends of the tube together will cramp and dislocate the base ring, as well as give rise to strains, wrinkles, inequalities, and so forth. Briefly, the whole base of the bag will be malformed and, therefore, incapable of rendering proper service. The result will be that the tire with which the bag is used will come from the mold with its bases improperly formed and very likely have to be sold as a "second". I have provided a process for building fluid bags whereby these and other difficulties are eliminated and proper bags produced.

One object of my invention is to provide a process for producing fluid bags having proper proportions and properly formed bases.

Another object is to provide a process for producing fluid bags having accurately fixed and located base rings.

To these ends and also to improve generally upon processes of the character indicated, my invention consists in the following matters hereinafter described and claimed.

In the accompanying drawings:

Figure 1 is a radial cross-section of the rim of a collapsible drum, which is preferably provided for the carrying out of my process, with the fluid bag laid thereon, but not made into a tube, the step of turning up of the edges of the material being indicated in dotted lines and the thickness of the plies being somewhat exaggerated;

Fig. 2 is a radial cross-section of the bag at completion and showing the bag's valve in position; and Fig. 3 is a perspective view of the drum with the completely built bag thereon, the valve being omitted.

Without limiting my invention thereto, I describe it by reference to the accompanying drawings. I provide a preferably cylindrical collapsible drum 1 upon which to build up the bag and having, of course, a diameter to give the proper bag-diameter. In the face of the drum and extending throughout the circumference thereof is a groove 2. This groove is so contoured in cross-section as to give the proper and desired contour to the base of the beg, as shown. It quite closely receives the rubber base ring or strip 3 of the bag to properly locate and hold it in position, allowance being made, of course, for such layers of material, as the hereinafter referred to strip 4, as it is desired to place on the exterior of the ring. Thus this groove acts at all times during the building of the bag to hold the base ring just where it belongs and insures that, when the building of the bag is finished, the base ring and adjacent parts will be located just as they should be.

In the building of the bag, I preferably proceed as follows: First, a strip of rubberized fabric 4, of sufficient length to encompass the drum circumferentially and so form the outer covering of the bag, is placed about the drum and fitted into the groove. Preferably, this fitting is done by a rolling tool, as a "full roller" or a "stitching tool," and the threads of the material are crowded together, or spread, thereby to smoothly and accurately fit the fabric in the groove; the process being similar to that employed in laying on fabric in the building of a tire. This strip, as are the outer plies 5 and 6, is sufficiently wide so that, when its side edges are ultimately lifted from the drum and brought together, a tube of proper diameter of chamber will be formed.

The ply 4 having been placed, the solid rubber base ring 3 is placed in the groove, being properly and accurately located by the groove and fitting closely therein. Desirably, this base is of a character to be relatively hard after vulcanization. Next, a second ply 5 of rubberized fabric is laid on in a similar manner to that in which the first one was handled and fitted to the top of the base ring. Next, a ply of soft rubber 6, i. e., rubber that will be soft and pliable after vulcanization, is laid on and fitted into the groove. This completes the laying-on operation. It will be understood that up to the present each ply has remained flat upon the drum.

Next, the outer edges of plies 6, 5, and 4, in order, are brought up and over as indicated in dotted lines, Fig. 1, and the edges fastened to produce after inflation the ring form desired for the finished bag. Preferably, before the closing of the bag, a suitable inflation valve 7 is introduced, a hole 8 being provided in the drum therefor, and fastened in any approved manner. This completes the building of the bag and the drum is now collapsed, the bag removed, inflated, and introduced to a mold and vulcanized.

It will be seen that, during the building of the bag, the base ring is at all times properly and unshiftably located so that, not only is it initially correctly placed, but also it can not be shifted out of place during the application of the various plies. The accurate fitting of the plies gives a structure well capable of keeping the base ring and the plies in the proper relative location when the bag is removed from the drum and when it is being vulcanized. Again, the groove is, as shown, preferably sufficiently deep to accurately form the lower, i. e., radially inner, or base, portions of the bag. The result is a bag with its base accurately formed and its base ring properly located.

It will be understood, of course, that the various plies are stuck each to the other, and the base ring to its adjacent plies, as by rubber cement or by the "tackiness" of the material. I have found it convenient to apply cement to the plies as they are laid down, interleaving "Holland cloth," as 9 Fig. 1, between the various plies and extending in from the outer edges of the plies a suitable distance to, for the moment, separate and prevent from sticking together such portions of the plies as are later to be turned up, the Holland cloth being removed as the successive plies are turned up.

In fastening the up-turned edges of the plies together, as by rubber cement, I may overlap them as indicated at 10 and 11 at the fastening of plies 6 and 4, or can cut the ply a little short in width and unite the edges by a supplemental strip, as the fastening of ply 5 by the strip 12, depending upon the particular circumstances.

Conveniently, the laying on of the materials and the fastening of the edges is done while the workman slowly rotates the drum (the drum, of course, being understood as suitably mounted for that purpose), a ply, say, being laid on portion by portion until the drum has been turned through one rotation and the full length of the ply laid on. When fastening the edges of the plies, I conveniently use a straight, flat piece of heavy leather, as indicated in dotted lines at 13, Fig. 1, bridging the groove, and perhaps two and one-half feet long circumferentially and of uniform width, to furnish a base on which to rest the edges being fastened and to serve as a size-determiner for the bag, the leather being slid circumferentially as the work progresses and, of course, removed before the edges of the ply are fastened throughout the circumference. As indicated in Fig. 1, the plies are turned up along the edges of the piece 13, such edges serving as straight edges, the width of the strip determining the size of the chamber of the bag, and the strip making easy the exact dimensioning and true turning up of the bag. Different sized strips are, of course, used for different sized bags.

It will be understood that, although I have described my process as including the providing and the use of a cylindrical member upon which to build up the bag, this being the preferable procedure since it gives a true annulus and eliminates that possibility of throwing the base ring out of true that might arise if the bag were built as a straight tube and then cramped and its ends joined to make an annulus, I do not limit my invention to the use of a cylinder as certain of the features of advantage may be arrived at by the use of other shapes, as straight.

It will be understood that, although in the particular bag selected, by way of example, three plies are used, the process is adaptable to the making of bags of any suitable number of plies, both exterior and interior of the base ring, as desired, and I include the making of such bags as within my invention.

As suggested in Fig. 1 in dotted lines, the groove 2 is preferably straight throughout its length, i. e., does not depart laterally from a straight line. Also, of course, its cross-sectional configuration is desirably constant throughout its length to give the base of the bag a constant cross-sectional configuration, and it preferably lies in a plane perpendicular to the longitudinal axis of the cylindrical drum, giving the groove, the base ring, and the bag a truly circular form.

It will be seen that I have provided a process for the quick, accurate, and comparatively inexpensive production of fluid bags, the product of which is a fluid bag with an accurately formed base and properly located base ring.

Having thus described my invention, what I claim as new, and desire to secure by United States Letters Patent, is:—

1. In the process of making an annular fluid bag having a formed base and a base ring originally separate from a wall-layer lying exteriorly of the ring in the finished bag; using a cylinder of suitable diameter and having a circumferential groove therein of cross-sectional conformation corresponding to the desired base-shape of said bag and of a bottom width to closely receive the base ring, placing a strip of bag-forming material, designed to lie exteriorly of said ring in the finished bag circumferentially about said cylinder, of sufficient width to fit said groove and extend to each side thereof sufficiently to be used in forming the body of said bag, and fitting said material into said groove, fitting the base ring into said groove, applying another strip of bag-forming material of dimensions similar to those of the first strip, and finally picking up the edges of said strips and joining them to form the bag; substantially as described.

2. In the process of making an annular fluid bag having a formed base and a base ring originally separate from a wall-layer lying exteriorly of the ring in the finished bag; using a cylinder of suitable diameter and having a circumferential groove therein of cross-sectional conformation corresponding to the desired base-shape of the bag and of a bottom width to closely receive the base ring, placing a strip of fabric, designed to lie exteriorly of said ring in the finished bag circumferentially about said cylinder of sufficient width to fit into said groove and extend to each side thereof sufficiently to be used in forming the body of said bag, and fitting said fabric into said groove, fitting the base ring into said groove, applying a second strip of fabric and a strip of rubber of dimensions similar to those of the first strip and fitting them in turn into said groove, and finally picking up the edges of said strips and joining them to form the bag; substantially as described.

3. In the process of making an annular fluid bag having a formed base and a base ring originally separate from a wall-layer lying exteriorly of the ring in the finished bag; using a cylinder of suitable diameter and having a circumferential groove therein of cross-sectional conformation corresponding to the desired base-shape of said bag and of a bottom width to closely receive the base ring, placing a strip of bag-forming material, designed to lie exteriorly of said ring in the finished bag circumferentially about said cylinder, of sufficient width to fit said groove and extend to each side thereof sufficiently to be used in forming the body of said bag, and fitting said material into said groove, fitting the base ring into said groove, applying another strip of bag-forming material of dimensions similar to those of the first strip, and finally picking up the edges of said strips and joining them to form the bag, while using a straight-edged size-determiner laid circumferentially of the drum, bridging said groove, and furnishing straight edges along which to turn up said strips; substantially as described.

4. In the process of making a fluid bag having a base ring originally separate from a wall-layer lying exteriorly of the ring in the finished bag; using a member upon which to build up the bag and having a groove of a bottom width to secure and locate the base ring, locating the ring and a wall-layer of the bag, designed to lie exteriorly of the ring, in said groove, and then building up the bag while utilizing the said groove to hold said ring and layer located with respect to each other during the building; substantially as described.

WARREN F. FERRIS.